United States Patent [19]

Messines et al.

[11] 4,192,392

[45] Mar. 11, 1980

[54] RECOVERY OF DRILLING FLUIDS

[75] Inventors: Jean-Paul Messines, Pau; Gaston Labat, Billere; Bernard Tramier, Pau, all of France

[73] Assignee: Societe Nationale Elf Aquitaine (Production), Paris, France

[21] Appl. No.: 879,225

[22] Filed: Feb. 21, 1978

[30] Foreign Application Priority Data

Feb. 24, 1977 [FR] France .................................. 77 05367

[51] Int. Cl.$^2$ ........................ C09K 7/00; E21B 21/00; E21B 41/00
[52] U.S. Cl. ...................................... 175/66; 175/206
[58] Field of Search ........................... 175/66, 206, 207

[56] References Cited

U.S. PATENT DOCUMENTS

| 2,870,990 | 1/1959 | Bergey | 175/66 |
|---|---|---|---|
| 2,941,783 | 6/1960 | Stinson | 175/66 X |
| 3,289,775 | 12/1966 | Stone | 175/66 |
| 3,500,943 | 3/1970 | Bingham, Jr. | 175/66 |
| 3,684,038 | 8/1972 | Nelson | 175/77 |
| 3,737,037 | 6/1973 | Bone | 175/66 X |
| 3,766,997 | 10/1973 | Heilhecker et al. | 175/66 |
| 3,964,557 | 6/1976 | Juvkam-Wold | 175/66 |

OTHER PUBLICATIONS

Anon., "How to Reduce Fine Mud Solids for Better Drilling," *The Oil and Gas Journal*, Mar. 22, 1965, pp. 75–77.

*Primary Examiner*—Stephen J. Novosad
*Attorney, Agent, or Firm*—Ostrolenk, Faber, Gerb & Soffen

[57] ABSTRACT

Recovery of drilling fluid from the mud leaving the well. The mud is first subjected to conventional separation on screens, settling tanks and/or hydrocyclones, whereafter the resulting liquid is centrifuged. The centripetal effluent of the centrifuge is recycled, alone of in mixture with non-centrifuged liquid, to the drilling tool.

The process is applicable to drilling on land and at sea, saves drilling additives, avoids the need for the maintenance of mud tips, transportation of spent mud and avoids pollution.

8 Claims, 1 Drawing Figure

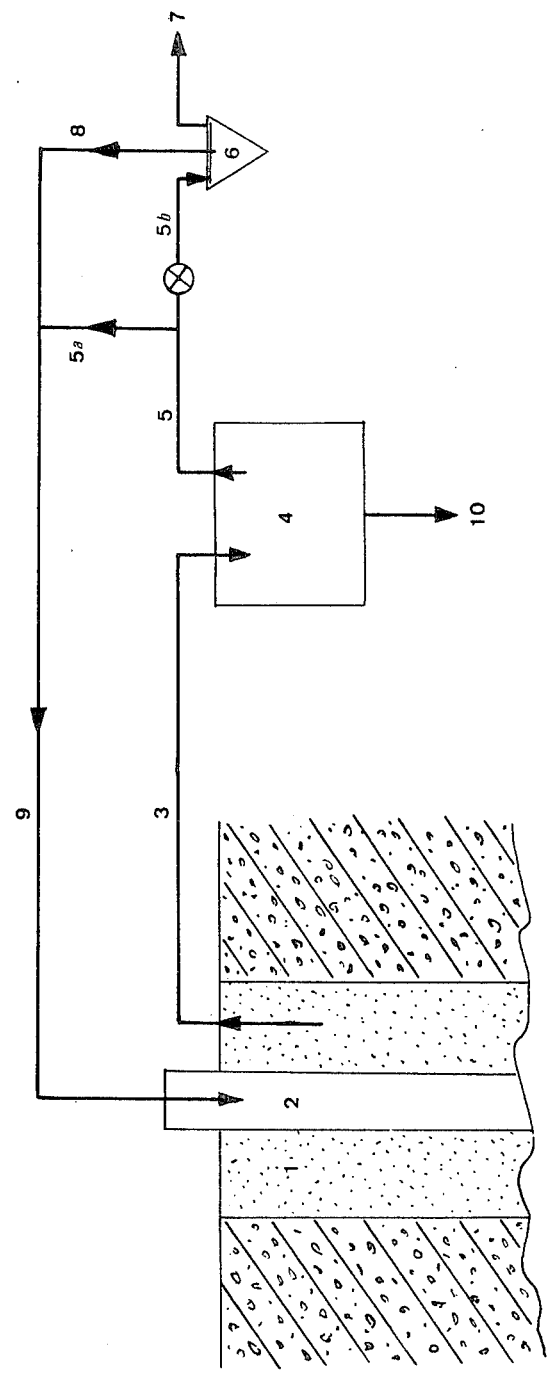

RECOVERY OF DRILLING FLUIDS

This invention concerns a process for the recovery of fluids used in ground drilling. It applies particularly to prospecting hydrocarbons, i.e. oil or natural gas. The invention relates to wells in which there is no inflow of water into the well and no addition of weighting agents in order to substantially increase the density of circulating mud; it applies to the large number of cases in which it is desirable to have the lowest possible mud density.

It is well known that to drill any geological stratum, there is injected into the well being drilled an aqueous suspension or solution of a suitable agent giving a specific density, viscosity and chemical composition of the medium most suitable for work in this geological stratum. Agents in widespread use at the present time are, in particular, bentonite, oil, lignosulphonates and biopolymers, i.e. polysaccharides. During drilling, this fluid becomes laden with the material from the ground and a mud results, its viscosity, density and composition varying as the mud circulates. Consequently, the viscosity, density and concentration in respect of minerals increases constantly and finally these properties are no longer suitable for operation. It is then necessary to discharge at least some of the mud and replace it by new fluid. However, this renewal requires prior separation of the solids dispersed in the mud, by means of screens, desanders and desiltors. If the solids are inadequately separated, the liquid generally has a very high density, so that a large quantity of fresh fluid has to be added to dilute it suitably. Such dilution has grave disadvantages: the drilling fluid containing the abovementioned special agents is relatively expensive so that its consumption in large quantities results in high costs; secondly, the volume of mud is increased by dilution and relatively large quantities thus have to be frequently discarded, because the capacity of the storage tank is necessarily limited; this results in subsequent processing of a large quantity of effluents and the difficult maintenance of drilling mud tips.

This invention provides a substantial improvement to the state of affairs in ground drilling. It enables a large proportion of the fluid used to be recovered and the amount of fresh fluid for introduction into the well to be greatly reduced. It also makes it possible to discard the solid materials dispersed in the drilling mud without any need for complex treatments for the maintenance of mud tips. It is applicable equally to drilling on land and at sea, because it does away with the high cost of transportation of spent mud and of pollution, as a result of this mud being discharged into the sea.

The novel process according to the invention comprises subjecting the drilling muds to centrifugation in conditions such that the density of the light effluent, i.e. the effluent from the axial region of the centrifuge, is contained between that of the processed mud and that of the initial drilling fluid which is not yet laden with ground material.

This invention results from the finding that those elements of the drilled ground which are particularly responsible for the adverse changes in the rheological properties of the mud, i.e. particles of dimensions less than about 100 microns, which are very inadequately eliminated by the hydrocylones used in this art, can be separated to a much greater degree by mechanical centrifugation. If the particle size of the materials which can be separated by the various conventional devices from drilling muds are examined, the following results will be found:

| | |
|---|---:|
| Vibratory screens | up to aout 175 microns |
| Desanders (cyclones) | 150 microns |
| and partially | 80 microns |
| Desiltor hydrocyclones | up to about 100 microns |
| and partially | 30 microns |

As from dimensions of about 50 microns, and particularly 30 microns and below, the ground particles, particularly those from clay strata, are practically no longer eliminated by the conventional equipment in the petroleum art. As mentioned above, after separation of the solids these devices leave a mud whose density and viscosity soon exceed those which would still be compatible with the re-utilization of this mud.

According to the findings which have led to this invention, it is possible to extract at least most of the suspended particles by centrifugation from an excessively dense mud having a high content of fine particles below 100 microns, particularly about 50 microns and less, and recover a light effluent practically identical to or very little different from the fresh drilling fluid, this being impossible with the conventional apparatus indicated hereinbefore. Depending upon the type of centrifuge used and the conditions of its operation, even particles from 20 to about 2 microns can be removed; on the other hand, the fine particles of about 2 microns and below practically all remain in the centrifuged liquid and this has a marked advantage because it is precisely those which form the useful elements of the drilling fluid.

Centrifugation was used heretofore to recover the weighting agents, more particularly barium sulphate, from drilling muds which had become excessively dense and viscous; savings in the use of these agents were obtained by recycling with fresh fluid, but the liquid separated by the centrifuge could not be re-used; it had to be discarded and, with it, the other additives it contained, which are incidentally relatively expensive.

On the other hand, in the past, centrifugation has not been applied to relatively light muds containing no weighting agent; the part played by the fine particles as indicated above had not been understood; the processing of large tonnages of muds generally involved in drilling, by the relatively expensive means of centrifugation, probably also appeared prohibitive.

The value of this invention lies precisely in that the centrifugation is applied specifically to muds containing only fine particles, most of which cannot be separated by the conventional means. Also, the operating conditions proposed are such that this apparently expensive means becomes perfectly economical when applied to drilling muds.

According to a first aspect of the invention, when a drilling mud formed from an initial fluid of density D has reached a dispersed particle concentration such that it becomes unusable for drilling to continue, it is subjected to one or more known treatments in order to remove therefrom the particles of dimensions above approximately 100 microns; the mud of density $D'$ thus "desanded" is then subjected to centrifugation so controlled that the centripetal effluent of the centrifuge has a density $D_c$ contained between D and $D+0.5(D'-D)$, whereafter this effluent is re-introduced into the well undergoing drilling.

Preferably the centrifugation is controlled to give a light effluent of density from D to D+0.33 (D'−D). In other words, in the preferred form of the invention, the maximum density accepted for the light effluent for recovery is equal, to that of the fresh drilling fluid (D) plus one-third of the difference between it and that of the mud unsuitable for re-use (D'), which contains only particles of dimensions less than about 100 microns.

In the case of small wells, in which the rate of flow of mud per hour is not in excess of about 25 cubic meters, the above operations can be applied to all the mud circulating in the well during drilling. However, in most cases, in which the rates of flow are very much in excess of this value, the present invention also enables centrifugation of the muds to be applied usefully and economically; in such cases only part of the desanded mud (D') is centrifuged and the resulting light effluent is mixed with the remainder of this mud, so that its density D' is reduced to a lower value D" contained between D' and D.

In this embodiment of the invention, the proportion of dirty mud (D') subjected to centrifugation is so calculated that the resulting mixture (density D") of residual mud with light centripetal effluent is sufficiently low in solid particles to be suitable for drilling. Depending upon circumstances, the fraction of desanded mud subjected to centrifugation may be just 1/20 to 1/5 of the total flow of this mud, but nevertheless reduces density to the point of making it suitable for drilling.

The embodiment of the invention wherein only a fraction of the desanded mud is subjected to centrifugation is particularly suitable for continuous operation. In this type of operation, as the mud leaves the well it is continuously processed in manner known per se to eliminate the solid particles in excess of about 100 microns in size; a fraction of the effluent thus desanded is subjected to centrifugation; the centripetal liquid from centrifugation is mixed with the remainder of this effluent which is thus diluted and hence lightened, and the liquid mixture is continuously pumped into the drilling tool. This gives a stable state of operation in which the well is continuously fed with a mud of constant density during the drilling operations. The parameters of the process are, of course, so controlled that this mud has the required physical properties; the rising mud also has the stipulated characteristics.

Since it is difficult to speak of physical properties, more particularly density and viscosity, of a medium so roughly heterogeneous as a drilling mud leaving the well, these properties are determined, within the scope of this invention, after the separation of grains and particles in excess of about 100 microns in size, i.e. the mud which is termed "desanded mud" during this description.

The accompanying drawing is a diagram showing the arrangement of a system according to the invention.

Referring to the drawing, reference 1 denotes the well, 2 the hollow shaft of the drilling tool, 3 the pipeline containing a pump (not shown) for withdrawing the mud from the well 1. Conventional devices for separating the solids dispersed in the mud are provided at 4 and are generally vibratory screens followed by one or more cyclones known in the art as desanders; the device 4 may, if required, include a finer separator of the desiltor type, which is capable of removing most of the 100 micron particles an approximately half those above 30μ; however, these latter devices are not essential because the centrifuge 6 carries out the same work to about 10–20μ.

The solids or heavy muds separated in the device 4 are discharged via 10 while the de-sanded mud, which generally contains no particles above 100μ, is recovered via pipe 5; the latter branches into two branches 5a and 5b, the former communicating with the recycling pipe 9 carrying the desanded mud to the intake system for recycling to the drilling tool 2, while 5b carries a fraction of this mud to the centrifuge 6; a suitable valve (no reference shown) in the branch 5b enables the rate of flow of the mud for centrifugation to be controlled.

The solids separated by centrifugal force at 6 are discarded at 7, while the centripetal liquid, i.e. a very much lightened mud, passes via pipe 8 to be mixed with the heavy mud to form a mixed mud in the return pipe 9.

As before, D' will denote the density of the desanded mud leaving device 4 via 5; $D_c$ is the density of the centripetal light effluent coming from the centrifuge 6 via 8; the density of the mixed mud formed by dilution of the mud D' with the light effluent $D_c$ is designated D". Since the most practical criterion for the quality of a drilling mud is its density, the system according to the invention is controlled on the basis of the densities of the muds.

The continuous process according to the invention is preferably so carried out that the desanded mud is not yet at its critical utilization limit. In other words, the density D' remains below the critical density after which drilling would be defective. The rate of flow of the muds of density $D_c$ is then controlled so that the density D" of the mixture re-introduced into the well (pipe 9 in the drawing) is sufficiently low and will give substantially the same density—after the mixture laden with the materials from drilling the ground—has in turn been desanded in the device 4.

Operation thus takes place with a constant or approximately constant density D', which is very economic because it entails very few fluid losses and applies to the centrifuge only a small fraction of the total flow of the muds.

The volume X (of light effluent $D_c$) required to produce 100 volumes of mixed mud D" by mixture with 100-X volumes of desanded mud D', can be calculated from the conventional dilution equation, which gives:

$$X = 100(D' - D'') \div (D' - D_c).$$

Since the invention is applied particularly to drilling with muds whose densities do not exceed 1.25 and the viscosities 80 cp, the following example is based on continuous operation with a mud whose density during operation is less than this value.

Drilling is carried out with bentonite fluid, the initial density D of which is 1.03. The critical density $D_L$ after which operation becomes defective is 1.22 measured of course on desanded mud. The rheological properties of the mud are still very good at a density D' of 1.12 intermediate D and $D_L$. D' is therefore fixed at that value. The drilling feed and the rate of flow of the mud, and hence the concentration in solids carried by these muds, are such that the density of the desanded mud must be reduced from 1.12 to 1.11 to enable it to be reused, i.e. reintroduced via 9 (see diagram), and to give the value of 1.12 again at the output of group 4. Also, as will be seen hereinafter in Example 3, it is possible to lighten the desanded mud from a density of 1.12 (D') to 1.05

($D_c$) by economic centrifugation; the condition according to the invention, $D_c = D$ to $0.33 (D'-D)$ is thus amply satisfied since $$1.05 = 0.118(1.12 - 1.03)$$

coefficient 0.118 being contained between 0 and 0.33. Drilling thus operates with the following densities:

$D' = 1.12$ $D_c = 1.05$ $D'' = 1.11$

Under these conditions, the volume X of centripetal effluent $D_c$ to be mixed with the desanded mud $D'$ to give 100 volumes of recycled mud $D''$ is:

$$X = 100(D' - D'') \div (D' - D_c)$$

$$= 100 \times 0.01 \div 0.07 = 14.3.$$

14.3% of centrifuged mud is therefore sufficient to be able to carry out the continuous mud processing with a constant density of 1.12 at the outlet of the separators 4. Most of the initial bentonite remains in the circulating mud, its losses being reduced to the small proportion of this agent retained by the solids removed at 7 and 10.

In connection with the above Example, it is interesting to note that only a small correction of the density $(D' - D'' = 0.01)$ was sufficient to give perfect drilling operation with a constant density. Without the treatment according to the invention, the density would increase by 0.01 per 3-hour cycle, and in a short time it would therefore be necessary to remove some of the mud and dilute the remainder with fresh drilling fluid.

Since centrifugation is a stage of prime importance in the process according to the invention, it must be so carried out as to leave practically no particles in excess of 20 microns in the centripetal effluent; to this end, the centrifugal force applied must generally be at least 1300 g for muds of a density below 1.25; it is preferably 1500 g of 2500 g depending on the nature of the processed mud and the type of equipment used.

The two main factors controlled to give the required density of the light effluent (the centripetal effluent) are the centrifugal force or the speed of rotation and rate of flow to the centrifuge inlet. For example, during a pilot test, in the specific case of bentonite mud with a density of 1.12 centrifuged at 3500 rpm at a centrifugal force of 1800 g, the centripetal liquid had a density of 1.05 when the centrifuge was fed at a rate of 1070 l/h, while the density increases to 1.063 if the rate of feed is increased at 1150 l/h. It is therefore advantageous to check the two factors concerned to obtain the required density.

The non-limiting examples 1-5 show how centrifugation is carried out while Examples 6 and 7 show the difference in the results between the action of a centrifuge and of a powerful hydrocyclone.

EXAMPLE 1

During ground drilling in oil prospecting, with bentonite-based fluid, the density of the circulating mud being kept at a value of 1.09, 40 cubic meters of fresh fluid had to be added after separation of the solids in a desander in the conventional manner, after 24 hours' operation, the drilling feed being 33 meters.

In the same well carried out under the same condition but with the light effluent being recovered during 12-hour centrifugation (out of the 24 hours' total operation), only 21 cubic meters of fresh fluid was required for the same 33 meter feed.

EXAMPLE 2

The process according to the invention was tried out in a pilot test in a well using a bentonite mud. The treatment was carried by means of a type D 26 centrifuge made by Society Guinard.

Before introduction into the well, the initial bentonite fluid had a density of 1.03. The circulating mud was subjected to centrifugation when its density reached 1.123 and the centrifuge was controlled to give a light effluent of a density between 1.05 and 1.06.

The following Table of the results shows how the density of this centripetal effluent varies with the centrifugal force applies.

TABLE I

| Absolute speed rpm | Relative speed rpm | g | Input rate of flow l/h | Density of light effluent | Dryness of sediment % |
|---|---|---|---|---|---|
|  | 46 | 900 | 1 070 | 1.0765 | 69.5 |
| 2500 | 15 | 900 | 1 070 | 1.0675 | 73 |
| 3000 | 18 | 1 300 | 1 070 | 1.059 | 73.25 |
| 3500 | 20 | 1 800 | 1 070 | 1.052 | 74 |
| 4000 | 24 | 2 300 | 1 070 | 1.046 | 75 |
|  |  |  | 1 680 | 1.051 | 75.5 |

It will be seen that the required density of the centripetal effluent is reached at speeds of above 3000 rpm, i.e. centrifugal forces above 1300 g. It will be seen that the resulting optimum density represents about 94% of the critical density of the processed mud. The separated sediment has good dryness and can be buried directly without any prior treatment.

EXAMPLE 3

Pilot tests similar to those of the preceding Example were carried out with a mud obtained from a biopolymer fluid. The density of the fluid before it was used was 1.01. The mud was processed when it reached a density of 1.075. The results were as follows.

TABLE II

| Absolute speed rpm | Relative speed rpm | g | Input rate of flow l/h | Density of light effluent | Dryness of sediment % | Residue on centrate % |
|---|---|---|---|---|---|---|
| 3 000 | 18 | 1 300 | 900 | 1.01 | 74.25 | 1 |
|  |  |  | 900 | 1.01 | 74.5 | 0 |
| 3 500 | 20 | 1 800 | 1 080 | 1.01 | 74.5 | 0 |
| 4 000 | 24 | 2 300 | 900 | 1.01 | 75.4 | 0 |

It will be seen that a density of 1.01 of the light effluent can be reached with a centrifugal force of just 1300 g.

EXAMPLE 4

In a site operation similar to that in Example 1, a 33 cm diameter bowl centrifuge was used for only 13 hours per day. This apparatus was fed directly with the drilling mud without prior passage through desilters. The light effluent from the centrifuge had a density of 1.04; by recycling it in the circulating mud, the density of the latter was kept at a practically constant value from 1.08 to 1.09. The pasty heavy effluent of density 1.72 to 1.78 was only 0.2 cubic meter per hour, which was easily removed. The centrifuge was fed at the rate of 6 cubic meters per hour and the centrifugal force was about 1500 g. During the operations, about 10 cubic meters of fresh effluent added to the circulating mud was sufficient, instead of 40 cubic meters required by the conventional process, as was seen in Example 1.

EXAMPLE 5

In a site test, the same drilling mud with a density varying between 1.08 and 1.10 was subjected firstly to the action of a 102 mm cone hydrocyclone (of the desiltor type) and, secondly, to the action of a continuous horizotal-bowl centrifuge (Guinard D33, maximum diameter 330 mm). The centrifuge operated at 3200 rpm with a force of 2100 g. The following results were found:

|  | Centrifuge | Hydrocyclone |
|---|---|---|
| Density of mud before processing | 1.08–1.10 | 1.08–1.10 |
| Density of mud after processing | 1.03–1.04 | Unchanged |
| Approximate density of discharged heavy effluent | 1.80 | 1.15 |
| Efficiency (volume of spoil to total volume discharged) | 50% | 3.5% |

Since the processed mud contained only a few particles more than 100 microns in size, the action of the hydrocyclone was minimal; against this, the centrifuge removed a high proportion of solids, leaving in the mud only particles less than 10 microns in size and delivering a considerably lightened fluid. This comparison shows the new role played by centrifugation instead of the hydrocyclone.

EXAMPLE 6

The two devices of Example 5 were used comparatively for processing the same mud as in Example 5 during a 311 mm well drilling operation. The test conditions and results obtained with the two series of processing are given below.

|  | Centrifuge | Hydrocyclone |
|---|---|---|
| Number of days in operation | 18 | — |
| Real time in hours | 301 | 301 |
| Speed of rotation in rpm | 3200 | |
| Centrifugal force | 2100 g | |
| Volume of mud processed per hour, cubic meters | 3.8 | 200 |
| Volume of mud discharged per hour, cubic meters | 0.226 | 1 |
| Total quantity of solids discharged by centrifugal effect | 300 | 82 |
| Volume of spoil (dry) in cubic meters discharged by centrifugal effect | 34 | 10 |
| Volume of mud of density 1.10, lest, in cubic meters | 34 | 291 |
| Total quantity of (dry) solids discharged by centrifugal effect, in tonnes | 90 | 25 |
| Dilution with fresh mud per meter drilled (including feed) | 605 1/m | 900 1/m |

These results clearly show the advantage of centrifugation in respect of a relatively low density mud.

We claim:

1. A process for the recovery of drilling fluid by separating the solids contained in the mud leaving the drilling well, in which the initial fluid used has a density D, the separation of the solids gives a mud of density D' which mud still contains particles of a size less than about 100 microns, a part of this latter mud being subjected to centrifugation, the centrifugation being so controlled that said centripetal effluent has a density $D_c$ the value of which is comprised between D and D+0.5 (D'−D) mixing the centripetal effluent with the remainder of the mud D', whereby a lighter mud is formed the density D" of which is comprised between that of the initial fluid (D) and that of the remaining mud (D') and recycling said lighter mud to the drilling well.

2. A process according to claim 1, wherein the density $D_c$ of the centripetal effluent is limited to a value comprised between D and D+0.33 (D'−D).

3. A drilling fluid recovery process, according to claim 1, wherein said centripetal effluent contains only solid particles of dimensions less than 20 microns.

4. A process according to claim 1, wherein said centripetal effluent contains only solid particles the size of which does not exceed 2 microns.

5. A process according to claim 1, in which the critical density, above which the mud leaving the well is no longer re-usable, is at most 1.25, and the density D' after separating the solid particles of more than about 100 microns is 1.07 to 1.12, the centrifugation being carried out to give a centripetal effluent of a density of 1.01 to 1.06.

6. A process according to claim 1, wherein one-twentieth to one-fifth of the flow of mud of density D' is subjected to centrifugation.

7. A process according to claim 1, in which the centrifugation is carried out with at least 1300 g, while the supply of mud for processing to the centrifuge is controlled in order to maintain the required density $D_c$ of the centripetal effluent.

8. A process according to claim 7, in which the centrifugation is carried out with 1500 to 2500 g.